United States Patent [19]

Melzer et al.

[11] Patent Number: 4,570,334

[45] Date of Patent: Feb. 18, 1986

[54] APPARATUS FOR ADJUSTING THE VALVE CONTROL OF A RECIPROCATING PISTON INTERNAL COMBUSTION ENGINE

[75] Inventors: Harald Melzer, Neufahrn; Joachim Hahn, Wolfratshausen, both of Fed. Rep. of Germany

[73] Assignee: Bayerische Motoren Werke AG, Fed. Rep. of Germany

[21] Appl. No.: 591,586

[22] Filed: Mar. 20, 1984

Related U.S. Application Data

[62] Division of Ser. No. 406,045, Aug. 6, 1982, Pat. No. 4,461,062.

[30] Foreign Application Priority Data

Aug. 7, 1981 [DE] Fed. Rep. of Germany ....... 3131278

[51] Int. Cl.[4] ........................ B23P 19/00; G01B 3/38; B25B 33/00

[52] U.S. Cl. ................................ 29/700; 29/156.4 R; 29/156.7 R; 33/180 B; 33/180 AT; 33/181 AT; 33/185 R; 81/3 R; 123/90.17

[58] Field of Search ........... 29/700, 156.4 R, 156.7 R; 33/180 R, 180 B, 180 AT, 181 AT, 185 R, 286; 81/3 R; 123/90.1, 90.15, 90.17, 90.31

[56] References Cited

U.S. PATENT DOCUMENTS

| | | | |
|---|---|---|---|
| 2,819,534 | 1/1958 | Kitzman | 33/181 AT |
| 3,192,639 | 7/1965 | Tomasko et al. | 29/156.4 R X |
| 3,300,010 | 1/1967 | Irish | 29/156.4 R X |
| 3,820,386 | 6/1974 | Grikscheit et al. | 33/180 B X |
| 3,858,289 | 1/1975 | Westervelt et al. | 29/156.4 R |
| 4,022,583 | 5/1977 | Kammeraad | 29/156.7 R |
| 4,050,275 | 9/1977 | Schlegel | 29/156.7 R X |

OTHER PUBLICATIONS

"Audi 100; Reparature-leitfaden, 5 Zyl.-Dieselmotor; Kraftstoffaufbereitung, Einspritzung"; pp. 40-44.

"V.A.G. Service, Reparature-leitfaden Golf, Jetta, Scirocco; Dieselmotor" (Jan. 1980); pp. 1, 9-10.

*Primary Examiner*—Howard N. Goldberg
*Assistant Examiner*—Ronald S. Wallace
*Attorney, Agent, or Firm*—Craig and Burns

[57] ABSTRACT

An apparatus for the adjustment of the valve control of a reciprocating piston internal combustion engine with a cam shaft driven from the crankshaft by an endless, flexible transmission member, in which the cam shaft and a valve control adjustment device are brought into engagement with each other by a control member arranged transversely to the plane of the separating surface of a control space housing with a loosened threaded connection; the driving gear is nonrotatably fixed with respect to the cam shaft by way of the transmission member drivingly connected with the crankshaft and tensioned by a tensioning roller while the crankshaft is nonrotatably fixed in the top dead center position with respect to the crankcase by a locking pin.

6 Claims, 2 Drawing Figures

Figure 1:
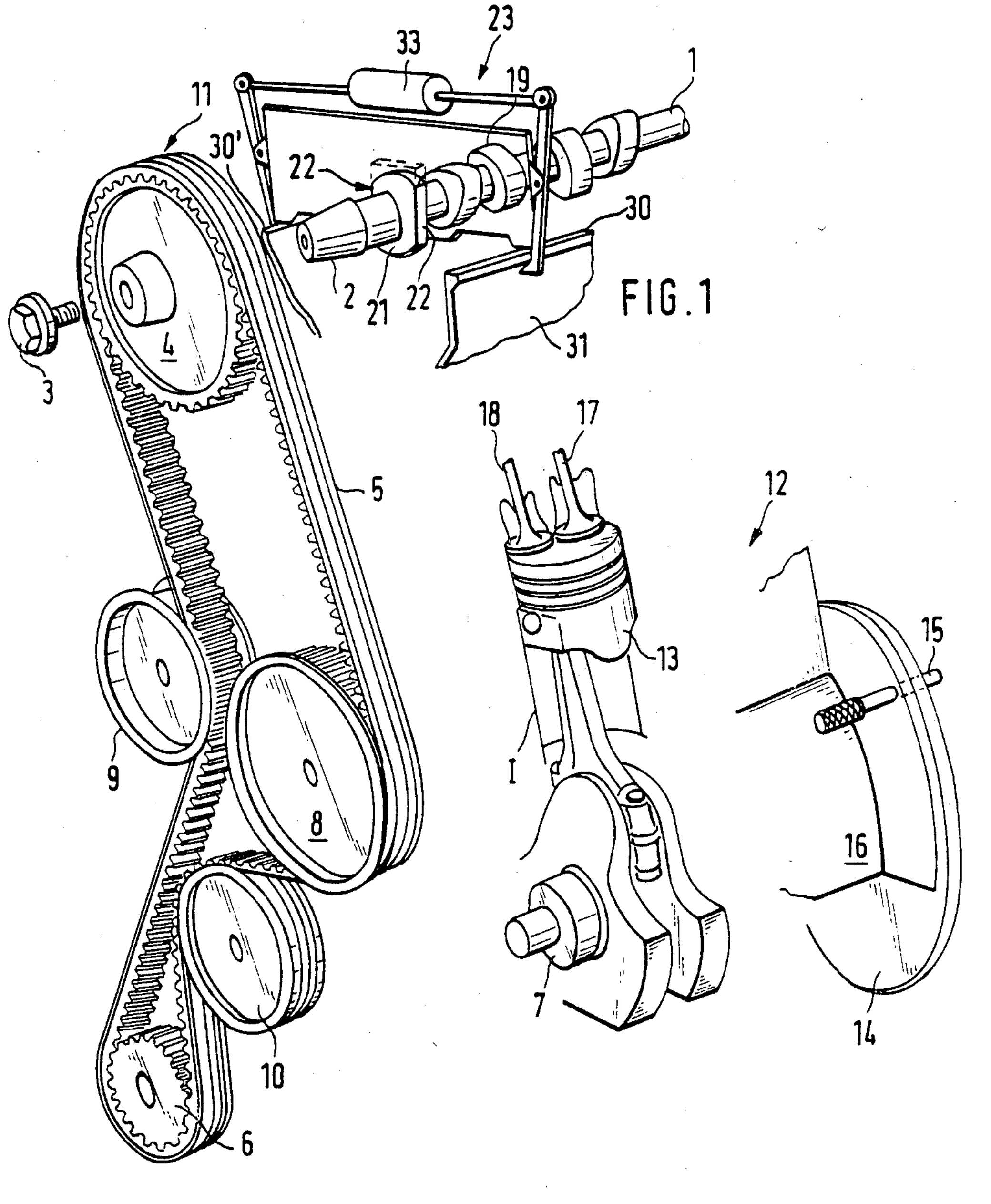

APPARATUS FOR ADJUSTING THE VALVE CONTROL OF A RECIPROCATING PISTON INTERNAL COMBUSTION ENGINE

This is a division of application Ser. No. 406,045, filed Aug. 6, 1982, now U.S. Pat. No. 4,461,062, issued 7/24/82.

The present invention relates to a method and device for the adjustment of the valve control of a reciprocating piston internal combustion engine, especially of a diesel engine.

It is known for the adjustment of the valve control in diesel engines to provide the cam shaft at the end opposite the drive wheel with a slot directed in the longitudinal direction of the cam shaft for the form-locking engagement of a device. The arrangement of the slot serving as two-edged key element for the valve control adjustment device is so made that for the adjustment of the cam shaft with a rotational cam shaft position coordinated to the reference cylinder, the slot is arranged parallel to the plane of the separating surface of the control space housing to the control space lid.

The prior art valve control adjustment device is formed of a section of a flat material and cooperates by way of its broad sides with the slot, respectively, the two-faced key element. A gap results between the separating surface of the control space housing and the adjacent broad side of the device when the device has been brought into engagement at the cam shaft. For the purpose of and exact adjustment of the cam shaft, the device has to be aligned parallel to the separating surface under interposition of feeler or thickness gauges on both sides of the cam shaft (VAG-Reparaturleitfaden/-Dieselmotor, January, 1980, Page 9).

With the prior art adjusting method, the determination of when the device is in a parallel position by means of the additional feeler or thickness gauges is time-consuming since different feeler or thickness gauges are required as a result of the tolerances in the distance of the cam shaft rotational axis to the separating surface, respectively, the plane thereof. Furthermore, an inaccurate adjustment of the cam shaft will result with thickness gauges arranged between the device and the separating surface at different distances from the center of the cam shaft during the bolting of the drive gear for the drivingly fixed frictional connection with the cam shaft. Since additionally with this prior art adjusting method the crankshaft is arranged in the top dead-center (TDC) position exclusively by coincidence of a marking on the flywheel with a reference mark on the engine housing, the prior art adjusting method is little-suited for use in series production of diesel engines by reason of a further possible source of error. With diesel engines, especially those having a relatively high compression, as a rule small tolerances exist in the main combustion space between the top of the piston in the dead-center position and the valve disks so that with an inaccurate adjustment of the valve control, engine damage is the likely consequence by reason of the impingement of the valve disks on the piston top.

The present invention is concerned with the task of simplifying the method for the adjustment of the valve control for a reciprocating piston internal combustion engine and to provide therefor a mechanical device, by means of which a maximum degree of adjusting accuracy is achieved.

The underlying problems are solved in accordance with the present invention by bringing the cam shaft and the device for the adjustment of the control valves into engagement by means of a two-edged key arranged transversely to the plane of the separating surface of the control space housing. Adjustment first requires the loosening of the threaded connection of the driving gear which is nonrotatably fixed with respect to the cam shaft by way of a flexible transmission member in driving connection with the crankshaft and tensioned by a tensioning roller. The crankshaft of the engine is nonrotatably fixed in the top dead-center (TDC) position with respect to the crankcase during adjustment.

The advantages of the present invention essentially reside in that with a device adapted to be form-lockingly brought into engagement with the cam shaft in a direction transversely to the plane of the separating surface, this device rests directly on the separating surface and thus no further manipulations are required for purposes of the alignment, except for a cleaning of the separating surfaces within the area of the device resting thereon. Furthermore, the crankshaft is held accurately in the top dead-center (TDC) position by the mechanical blocking device, whereby the transmission member serves as auxiliary device during the bolting of the drive gear to the cam shaft when the tensioning roller is effective, and an additional holding device engaging at the drive gear can be dispensed with.

A further advantageous feature of the method in accordance with the present invention can be realized in that by the use of the valve control adjustment in accordance with the present invention, the cam shaft is caused to lead in the direction of rotation with respect to the driving gear by an angle corresponding to the running-in setting of the flexible transmission member. By taking into consideration changes occurring in the transmission member during the running-in operation, and early readjustment of the valve control can be dispensed with. In order to achive a flush abutment of the device on the separating surface or surfaces with alternate use, the advanced timing or lead angle is to be realized in the section of the device cooperating with the cam shaft. An adjustment of the control with a lead angle of the cam shaft is advantageous in particular with a cam shaft driven by a toothed belt having multiple V-profile on the outside thereof for the drive of further aggregates. In the device according to the present invention, the key cross section constructed as a two-edged member can be arranged at the outer circumference of the cam shaft approximately close to the bolted connection of cam shaft and driving gear and can be manufactured in a price-favorable manner by two parallel surfaces on a stop collar of the cam shaft. On the one hand, a two-edged member rigid from a strength point of view can be achieved without additional material expenditures and, on the other, disadvantageous elasticities in the adjusting mechanism are avoided for the accurate adjustment. If, finally, during the manufacture of the cams of a cam shaft the necessary rotation thereof takes place by way of the two-edged member, for example, by the use of a chucking tool, then a maximum degree of adjusting accuracy in the control of a reciprocating piston internal combustion engine, especially of a high compression diesel engine having minimum tolerances in the top dead-center position between piston top and valve disks is achieved by way of this two-edged member in conjunction with the valve control adjustment device of the present invention which is arranged clamped against the separating surfaces.

Figure 2:
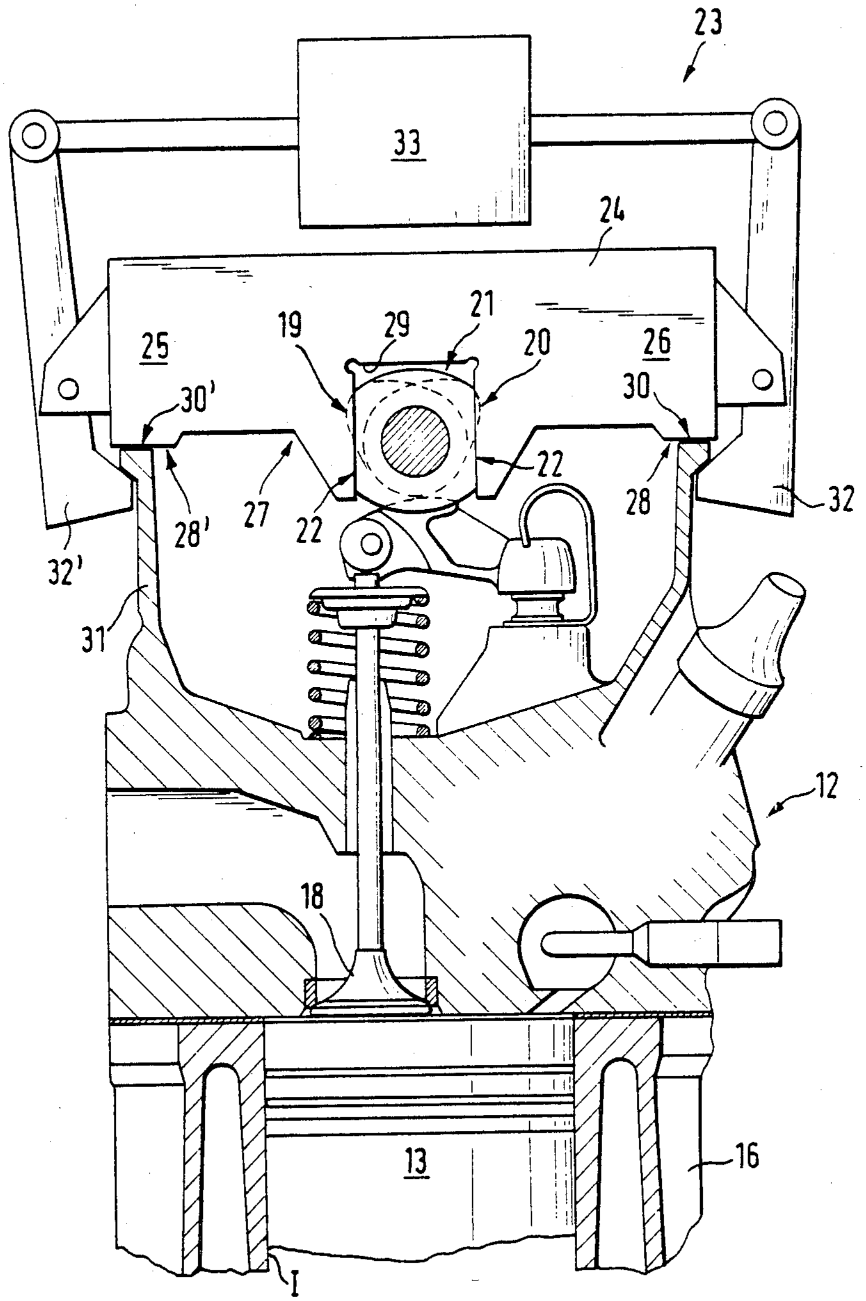

These and other objects, features and advantages of the present invention will become more apparent from the following description when taken in conjunction with the accompanying drawing which shows, for purposes of illustration only, one embodiment in accordance with the present invention, and wherein:

FIG. 1 is a somewhat schematic partial perspective view of a valve control in accordance with the present invention for a diesel engine; and FIG. 2 is a partial cross-sectional view through the diesel engine and valve control in accordance with the present invention.

Referring now to the drawing wherein like reference numerals are used throughout the two views to designate like parts, a drive gear 4 is adapted to be connected with a cam shaft 1 by way of a cone 2 and a central bolt 3. The drive gear 4 is in driving connection with a gear 6 on the crankshaft 7 by way of a toothed belt 5. Reference numeral 8 designates an injection pump gear, and referencwe numeral 9 a tensioning roller. A further gear 10 of an auxiliary aggregate is driven by way of the multiple V-profile 11 on the outside of the toothed belt 5.

For purposes of adjusting the valve control, the piston 13 is brought to the upper dead-center position in the reference cylinder 1 of the diesel engine 12. In this position, the crankshaft 7 is nonrotatably fixed with respect to the crankcase 16 by means of a locking pin 15 and by way of the flywheel 14.

In the compression top dead-center position of the piston 13, the inlet valve 17 and the exhaust valve 18 are closed, whereby the cam shaft 1 is arranged in a rotational position coordinated to the reference cylinder 1 determining the position of the cams 19 and 20 for the valves 17 and 18. The cam shaft 1 is nonrotably secured by a valve control adjustment device generally designated by reference numeral 23 by way of a two-edged member generally designated by reference numeral 22 which has two parallel engaging surfaces and is arranged on a thrust or stop collar 21 (FIG. 2).

The device 23 includes an element 24 made of flat material and arranged edgewise which includes abutment surfaces 28 and 28' formed in the two end areas 25 and 26 along a longitudinal side 27 thereof and a U-shaped recess 29 arranged therebetween along the longitudinal side 27. The device 23 is brought into engagement by way of the recess 29 with the two-edged member generally designated by reference numeral 22 which is arranged on the cam shaft 1 transversely to the plane of the separating surfaces 30, 30' of the valve control space housing 31. When the cam shaft has been positioned such that a form-locking engagement is achieved between the device 23 and the member 22, the device 23 impinges with its abutment surfaces 28 and 28' on the separating surfaces 30 and 30' and the two-edged member 22, which is arranged on the cam shaft 1 transversely to the plane of separating surfaces 30 and 30', is free to move relative to the sufficiently deep recess 29 up to the limitation of the stop collar 21. The device 23 is fixed to the control housing 31 by way of a spreading or expanding device 33 of any known type for engaging the clamping claws 32 and 32'. When the form locking engagement of the device 23 and the member 22 has been achieved, the cam shaft 1 is then properly adjusted and the proper timing of the opening of valves 17 and 18 by cams 19 and 20 is assured.

Furthermore, the cam shaft 1 can be given a lead angle with respect to the driving gear 4 by means of the device 23 by a corresponding angle in the direction of rotation for the compensation of a running-in setting of the toothed belt 5, i.e., for the compensation of an early extension of the timing belt 5. Appropriately, this angular lead is effected by way of the provision of the recess 29.

Finally, after the proper position of the cam shaft 1 has been achieved, the toothed belt 5 is placed over the driving gear 4 rotatably held on the cone 2 of the cam shaft 1 by means of the slightly loosened central bolt 3 and is adjusted to the tension required in operation by the tensioning roller 9. The driving gear 4 is thus nonrotatably fixed with respect to the cam shaft 1 which in turn has been nonrotatably secured by the device 23 by way of the toothed belt 5 and the nonrotatable crankshaft 7 held fixed by the stopping pin 15. The final step is the connection of the driving gear 4 to the cam shaft to achieve a secure frictional driving engagement with the cone 2 of the cam shaft 1. The adjustment device 23 is then removed along with locking pin 15 and the engine valve timing operation is complete.

While we have shown and described only one embodiment in accordance with the present invention, it is understood that the same is not limited thereto but is susceptible of numerous changes and modifications as known to those skilled in the art. For example, the two-edged member 22 is only one example of a key cross section provided internally or externally on the cam shaft. Other suitable form-locking complementary surfaces may be provided in lieu of the two-edged member 22 and recess 29 thereby permitting the basic adjustment of the valve control. Hence, we do not wish to be limited to the details shown and described herein but intend to cover all such changes and modifications as are encompassed by the scope of the appended claims.

We claim:

1. An apparatus for the adjustment of the valve control of a reciprocating piston internal combustion engine, said engine having a valve control housing, a crankshaft, a camshaft, a driving gear, an endless flexible transmission member drivingly connecting the crankshaft with the driving gear, and threaded connecting means adapted to be loosened for drivingly connecting the driving gear with the camshaft by way of a frictional engagement, the camshaft including a member having edge surfaces disposed intermediate ends of the camshaft, the driving gear being adapted to be nonrotatably fixed with respect to the camshaft while the threaded connection is loosened by said transmission member, and said engine being cooperable with a means for nonrotatably fixing the crankshaft with respect to the crankcase when a piston in a reference cylinder is at top dead-center, the apparatus comprising adjustment means arranged transversely to separating surfaces of the valve control housing for nonrotatably fixing the camshaft relative to the valve control housing, said adjustment means including a beam-like element having abutment surfaces formed along a longitudinal side thereof for engaging the separating surfaces of the valve control housing, recess means of predetermined cross section provided along the longitudinal side of said beam-like element for receiving the member disposed on the camshaft, and securing means for fixing the adjustment means relative to the valve control housing, the recess means including complementary surfaces engageable with said edge surfaces wherein locking engagement of the recess means with member disposed on the camshaft and fixing of the adjustment means relative to the valve control housing non-rotatably fixes the camshaft relative to the valve control housing.

2. An apparatus according to claim 1, wherein the means for nonrotatably fixing the crankshaft with respect to the crankcase includes a locking pin.

3. An apparatus according to claim 1, wherein the complementary member has two generally parallel surfaces forming the edge surfaces disposed intermediate the ends of the camshaft.

4. An apparatus according to claim 1, wherein the internal combustion engine is a high compression diesel engine.

5. An apparatus according to claim 3, wherein the internal combustion engine is a high compression diesel engine.

6. An apparatus according to claim 1, wherein the securing means includes clamping claws operatively engageable with said valve control housing by a spreading device.

* * * * *